(12) United States Patent
Masuda et al.

(10) Patent No.: US 10,948,242 B2
(45) Date of Patent: Mar. 16, 2021

(54) HEAT STORAGE REACTOR

(71) Applicants:NGK INSULATORS, LTD., Nagoya (JP); NATIONAL UNIVERSITY CORPORATION NAGOYA UNIVERSITY, Nagoya (JP)

(72) Inventors: Masaaki Masuda, Nagoya (JP); Yukio Miyairi, Nagoya (JP); Atsuhiro Ichinose, Nagoya (JP); Noriyuki Kobayashi, Nagoya (JP)

(73) Assignees: NGK Insulators, Ltd., Nagoya (JP); National University Corporation Nagoya University, Nagoya (JP)

( * ) Notice: Subject to any disclaimer, the term of this patent is extended or adjusted under 35 U.S.C. 154(b) by 49 days.

(21) Appl. No.: 16/390,318

(22) Filed: Apr. 22, 2019

(65) Prior Publication Data

US 2019/0331435 A1 Oct. 31, 2019

(30) Foreign Application Priority Data

Apr. 25, 2018 (JP) .............................. JP2018-084227

(51) Int. Cl.
*F28D 17/00* (2006.01)
*F28D 17/04* (2006.01)
*F28D 17/02* (2006.01)

(52) U.S. Cl.
CPC ........... *F28D 17/04* (2013.01); *F28D 17/023* (2013.01)

(58) Field of Classification Search
CPC .............................. F28D 17/04; F28D 17/023
USPC ........................................................... 165/10
See application file for complete search history.

(56) References Cited

U.S. PATENT DOCUMENTS

| | | | | |
|---|---|---|---|---|
| 5,069,199 A | * | 12/1991 | Messner | ................. F24S 20/64 126/400 |
| 2014/0230455 A1 | * | 8/2014 | Chandler | ................ F25B 21/04 62/3.3 |
| 2015/0300751 A1 | * | 10/2015 | Koschnitzke | ....... F28D 20/0056 165/10 |

FOREIGN PATENT DOCUMENTS

| JP | 2011-058678 A1 | 3/2011 |
|---|---|---|
| JP | 2013-124823 A1 | 6/2013 |

* cited by examiner

*Primary Examiner* — Davis D Hwu
(74) *Attorney, Agent, or Firm* — Burr & Brown, PLLC

(57) ABSTRACT

A heat storage reactor, comprising: a plurality of heat storage layers including first flow paths through which a first fluid can flow, each of the first flow paths being filled with heat storage materials; and a plurality of heat exchange layers including second flow paths through which a second fluid can flow. In the heat storage reactor, the plurality of heat storage layers and the plurality of heat exchange layers are alternately stacked. Further, open ends for the second flow paths are formed on a surface different from a surface on which open ends of the first flow paths are formed. Furthermore, at least a part of the second flow paths is formed in parallel to the first flow paths.

8 Claims, 10 Drawing Sheets

HEAT STORAGE REACTOR

This application claims the benefit under 35 USC § 119(a)-(d) of Japanese Application No. 2018-084227 filed Apr. 25, 2018, the entirety of which is incorporated herein by reference.

FIELD OF THE INVENTION

The present invention relates to a heat storage reactor.

BACKGROUND OF THE INVENTION

A heat storage technology using heat storage materials can provide high reaction energy. Therefore, the use of the technology is being studied in various fields. For example, in the field of vehicles such as motor vehicles, studies are being made to recover waste heat from a radiator, an exhaust gas or the like by heat storage materials to store the waste heat, and utilize the waste heat for catalytic converters, air conditioning systems, and the like.

As a conventional heat storage reactor, Patent Document 1 proposes a heat storage reactor having a honeycomb structure including a plurality of cells defined by partition walls, in which the honeycomb structure is filled with chemical heat storage materials such that cross-sectional patterns in a direction orthogonal to an axial direction of the honeycomb structure (a cell extending direction) are checkered. Further, Patent Document 2 proposes a heat storage reactor including first flow paths and second flow paths orthogonal to the first flow paths, each first flow path and each second flow path being vertically adjacent to each other in a vertical direction, in which chemical heat storage media are maintained along the second flow paths.

CITATION LIST

Patent Literatures

Patent Document 1: Japanese Patent Application Publication No. 2013-124823 A
Patent Document 2: Japanese Patent Application Publication No. 2011-58678 A

SUMMARY OF INVENTION

However, the heat storage reactor of Patent Document 1 is provided with open ends for flow paths through which a reactant fluid flows and open ends for flow paths through which a heat exchange fluid flows on the same surface, so that it is difficult to perform pressure independently pressure control for introduction of the reactant fluid into the heat storage reactor. Therefore, the heat storage reactor causes problems that the reaction of the chemical heat storage materials cannot be efficiently generated, and a heat output and an amount of heat radiation cannot be sufficiently improved.

On the other hand, the heat storage reactor of Patent Document 2 is provided with open ends of the flow paths for a reactant fluid and a heat exchange fluid on different surfaces, so that pressure control can be performed independently. However, since the flow paths for the two fluids are orthogonal to each other, it is necessary to elongate the flow paths for the heat exchange fluid in order to transfer sufficiently heat from the chemical heat storage materials to the heat exchange fluid. As a result, there are problems that the size of the heat storage reactor is increased and it is difficult to apply it to the field of vehicles such as motor vehicles for which reduction of their sizes is required.

The present invention has been made to solve the problems as described above, and an object of the present invention is to provide a heat storage reactor that has a large heat output and a large amount of heat radiation and can be miniaturized.

As a result of intensive studies to solve the above problems, the present inventors have found that a heat storage reactor having a specific structure can allow reduction of the size while improving the heat output and the amount of heat radiation, and have thus completed the present invention.

Thus, the present invention relates to:

a heat storage reactor, comprising:

a plurality of heat storage layers comprising first flow paths through which a first fluid can flow, each of the first flow paths being filled with heat storage materials; and a plurality of heat exchange layers comprising second flow paths through which a second fluid can flow, wherein the plurality of heat storage layers and the plurality of heat exchange layers are alternately stacked;

wherein open ends for the second flow paths are formed on a surface different from a surface on which open ends of the first flow paths are formed; and wherein at least a part of the second flow paths is formed in parallel to the first flow paths.

According to the present invention, it is possible to provide a heat storage reactor that has a larger heat output and a large amount of heat radiation and can be miniaturized.

DETAILED DESCRIPTION OF THE INVENTION

Hereinafter, preferred embodiments of a heat storage reactor according to the present invention will be specifically described, but the present invention should not be construed as being limited thereto, and various modifications and improvements may be made based on the knowledge of a person skilled in the art, without departing from the spirit of the present invention. A plurality of elements disclosed in each embodiment can form various inventions by optional combinations. For example, some elements may be deleted from all the elements described in the embodiments, or elements of different embodiments may be optionally combined.

Embodiment 1

Figure 1:
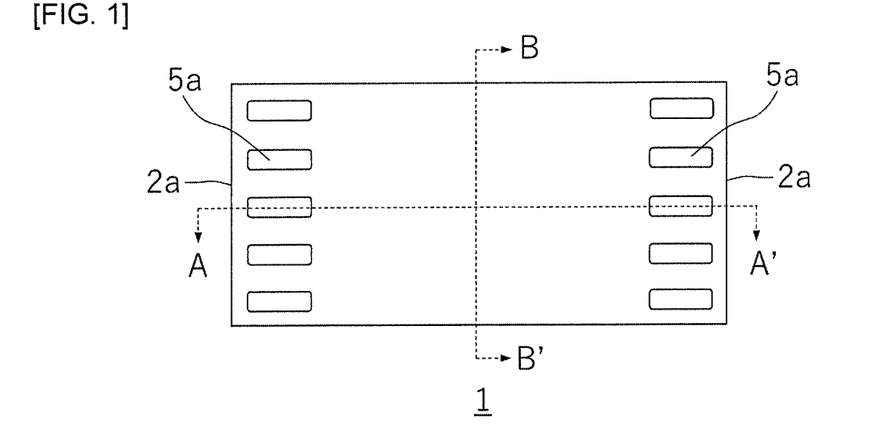
FIG. 1 is a view showing a side surface of a heat storage reactor according to Embodiment 1.
Figure 2:
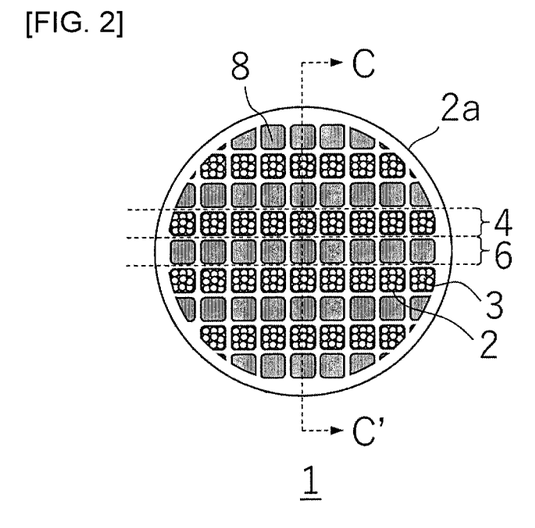
FIG. 2 is a view showing an end face of a heat storage reactor according to Embodiment 1.
Figure 3:
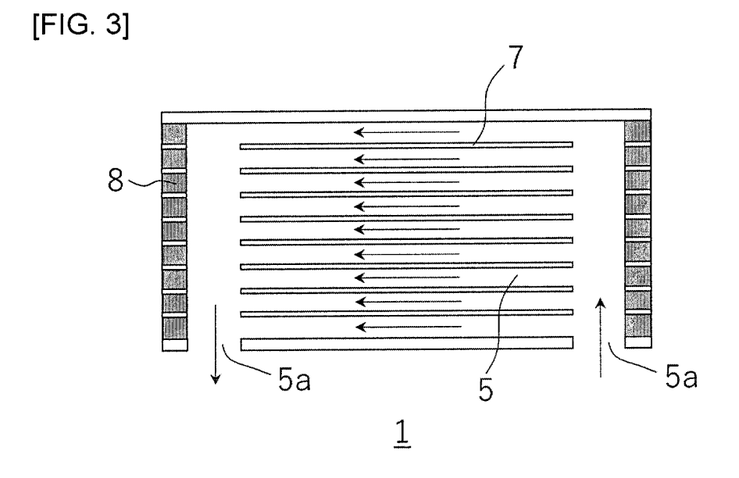
FIG. 3 is a cross-sectional view taken along the line A-A' in FIG. 1.
Figure 4:
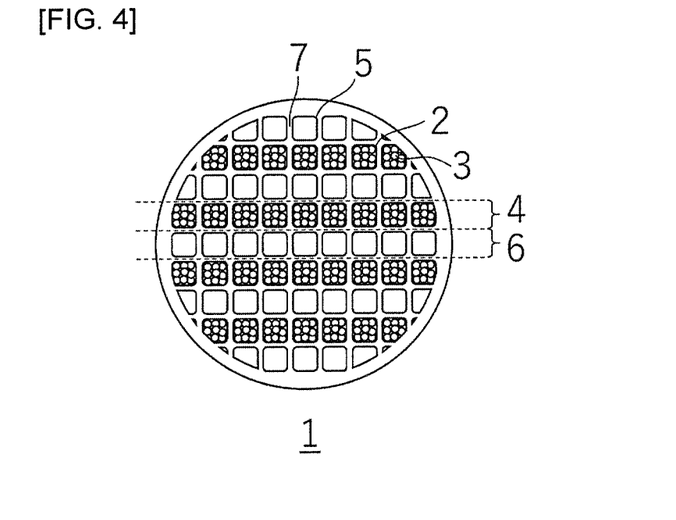
FIG. 4 is a cross-sectional view taken along the line B-B' in FIG. 1.
Figure 5:
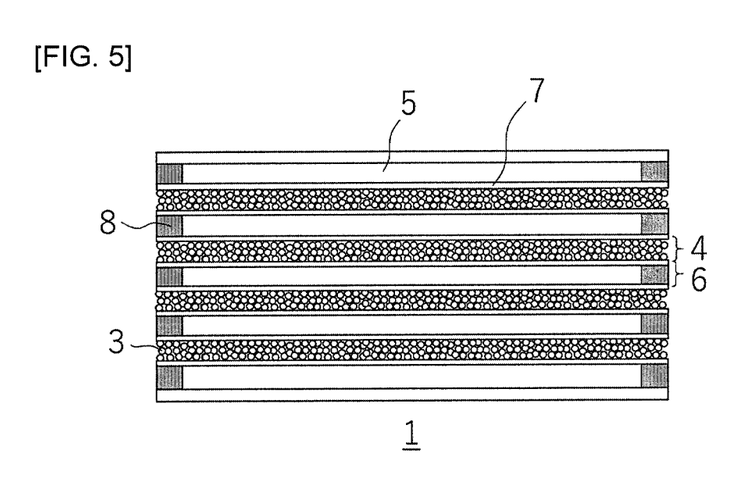
FIG. 5 is a cross-sectional view taken along the line C-C' in FIG. 2.

A heat storage reactor according to the present embodiment is a circular pillar shaped heat storage reactor. FIG. 1 is a view showing a side surface of the heat storage reactor according to the present embodiment 1, FIG. 2 is a view showing an end face of the heat storage reactor according to the present embodiment 1, FIG. 3 is a cross-sectional view taken along the line A-A' in FIG. 1, FIG. 4 is a cross-sectional view taken along the line B-B' in FIG. 1, and FIG. 5 is a cross-sectional view taken along the line C-C' in FIG. 2.

As shown in FIGS. 1 to 5, a heat storage reactor 1 according to the present embodiment includes: a plurality of heat storage layers 4 having first flow paths 2 through which a first fluid can flow, each of the first flow paths 2 being filled with heat storage materials 3; and a plurality of heat exchange layers 6 having second flow paths 5 through which a second fluid can flow. Further, the plurality of heat storage layers 4 and the plurality of heat exchange layers 6 are alternately stacked onto each other. Therefore, in the plurality of heat storage layers 4, heat generated from the heat storage materials 3 by allowing the first fluid to flow through the first flow paths 2 can be efficiently transmitted to the second fluid flowing through the plurality of heat exchange layers 6.

Figure 6:
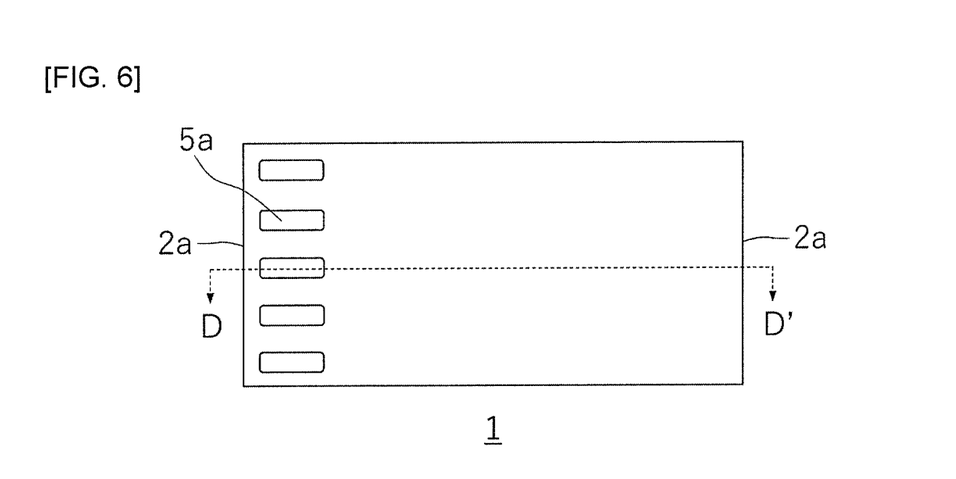
FIG. 6 is a view of showing a side surface of another heat storage reactor according to Embodiment 1.
Figure 7:
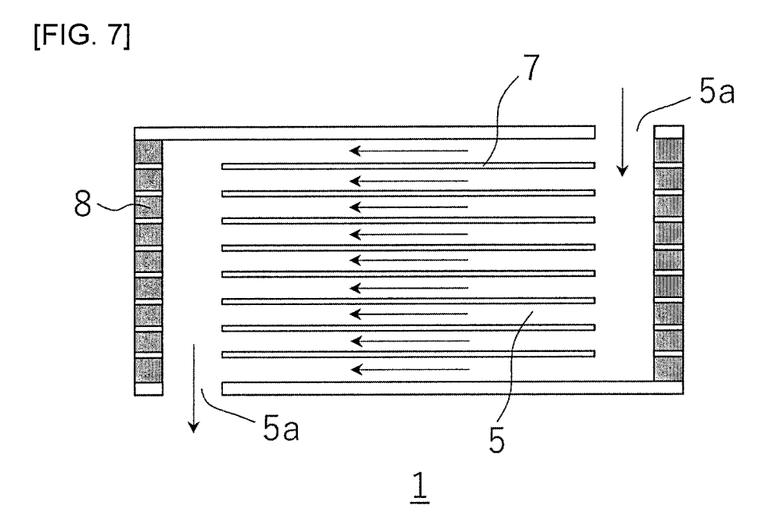
FIG. 7 is a cross-sectional view taken along the line D-D' in FIG. 6.

Open ends 5a of the second flow paths 5 are formed on a surface different from a surface on which open ends 2a of the first flow paths 2 are formed. More particularly, the open ends 2a of the first flow paths 2 are formed on an end face of the heat storage reactor 1, and the open ends 5a of the second flow paths 5 are formed on a side surface of the heat storage reactor 1. While the embodiment where an inlet and outlet of the second fluid are formed on the same side surface when viewed from the side view of FIG. 1 and the cross-sectional view of FIG. 3 has been described, the inlet and the outlet of the second flow may be formed on opposing side surfaces when viewed from the side view of FIG. 6 and the cross-sectional view of FIG. 7. It should be noted that since the end face of the heat storage reactor 1 as shown to FIGS. 6 and 7 and the other cross-sectional views are the same as those of FIGS. 2, 4 and 5, they are omitted.

As described above, the open ends 5a of the second flow paths 5 and the open ends 2a of the first flow paths 2 are provided on different surfaces, whereby the introduction of the first fluid into the first flow paths 2 and the introduction of the second fluid into the flow paths 5 can be performed simultaneously and separately from different sides. Therefore, it is possible to perform independently pressure control for introducing the first fluid into the first flow paths 2, so that the first fluid can be introduced into the first flow paths 2 under a pressure suitable for efficient reaction of the heat storage materials 3 filled in the first flow paths 2.

The first flow paths 2 have the open ends 2a formed on two different surfaces. Although the first fluid may be introduced into the first flow paths 2 from the open ends 2a provided on one side, it is preferably introduced into the first flow paths 2 by applying pressure from the open ends 2a provided on both sides. The introduction of the first fluid from the open ends 2a on both sides can allow the first fluid to be rapidly brought into contact with the heat storage materials 3 filled near a central portion of each first flow path 2, thereby enabling efficient reaction of the heat storage materials 3 filled in the flow paths 2.

At least a part of the second flow paths 5 is formed in parallel to the first flow paths 2. Therefore, it is easy to increase areas where the first flow paths 2 and the second flow paths 5 are adjacent to each other, as compared with a heat storage reactor for performing cross-flow type heat exchange. That is, in the heat storage reactor 1 according to the present embodiment, at least a part of the second fluid can perform counter-flow or parallel-flow type heat exchange, so that the heat output and the amount of heat radiation can be improved without increasing the size of the heat storage reactor.

The heat storage reactor 1 according to the present embodiment preferably has a honeycomb structure. More particularly, the first flow paths 2 and the second flow paths 5 are a plurality of cells defined by partition walls 7. The partition walls 7 serve to not only partition spaces but also play a role in heat transfer. Therefore, both of the first flow paths 2 and the second flow paths 5 are structured as a plurality of cells defined by the partition walls 7, thereby enabling the heat output and the amount of heat radiation to be further improved.

The heat storage reactor 1 having a honeycomb structure as described above can be produced according to a production method for a honeycomb structure known in the art. More particularly, first, a green body containing a ceramic raw material is formed to obtain a circular pillar shaped honeycomb formed body, and then fired to obtain a circular pillar shaped honeycomb structure. Slits are then formed on the side surfaces of the circular pillar shaped honeycomb structure to connect the plurality of second flow paths 5 and to form the open ends 5a, and openings at both end faces of the second flow paths 5 are then plugged to form plugged portions 8. The heat storage materials 3 may be filled in the first flow paths 2.

In addition, the step of forming the second flow paths 5 such as formation of slits and plugging may be carried out on the circular pillar shaped honeycomb formed body before being fired.

The ceramic raw material that can be used include, but not particularly limited to, SiC, metal-bonded SiC, metal composite SiC, $Si_3N_4$, metal composite $Si_3N_4$, cordierite, mullite, spinel, alumina, zirconia, zirconia-reinforced alumina, and the like. These can be used alone or in combination of two or more.

Here, the "metal-bonded SiC" that can be used includes metal-impregnated SiC, Si-bonded SiC, and SiC bonded by metallic Si metal or other metals. Examples of "other metals" include Al (aluminum), Ni (nickel), Cu (copper), Ag (silver), Be (beryllium), Mg (magnesium), Ti (titanium), and the like.

Moreover, the "metal composite SiC" that can be used includes those obtained by mixing SiC particles with metal powder and sintering the mixture.

Each of the partition walls 7 and the plugged portions 8 is preferably formed of a dense body. As used herein, the dense body refers to a body having a structure in which the first fluid and the second fluid do not permeate, and a large number of closed pores (voids closed without being penetrated) are formed on the surface. By forming each of the partition walls 7 and the plugged portions 8 from the dense body, it is possible to prevent the mixing of the first fluid into the second flow paths 5 and the mixing of the second fluid into the first flow paths 2.

Each partition wall 7 is preferably formed of a material that satisfies a thermal conductivity of 100 W/m·K or more, a heat capacity of 2000 J/L·K or less, or both. The use of such a material can lead to improved heat transfer performance by the partition walls 7, so that the heat output and the amount of heat radiation can be further improved.

It is preferable that each of one heat storage layer 4 and one heat exchange layer 6 include one row of a cell. Such a structure can allow the plurality of heat storage layers 4 and the plurality of heat exchange layers 6 to be further adjacent to each other, so that the heat output and the amount of heat radiation can be further improved.

In a cross section in a direction orthogonal to the cell extension direction, each cell may have a cross-sectional shape including, but not particularly limited to, a circle, an ellipse, a triangle, a quadrangle, or other polygons. Among them, the cross-sectional shape of the cell is preferably a square having one side of 2.0 mm or less. The setting of the cells in such a cross-sectional shape can facilitate effective heat transfer via the partition walls, so that the heat output and the amount of heat radiation can be further improved.

Further, the partition walls 7 that define the cells may each has a thickness of, but not particularly limited to, preferably 0.5 mm or less. By controlling the thickness of each partition wall 7 of the cells within the above range, the heat output and the amount of heat radiation can be further improved.

A ratio of the length of each first flow path 2 to a center-to-center distance between the adjacent heat storage layer 4 and heat exchange layer 6 is not particularly limited, and it may preferably be from 10 to 500. Such a configuration can allow the heat generated in the heat storage layers 4 to be efficiently transmitted to the second fluid flowing through the heat exchange layers 6.

The first fluid is not particularly limited as long as it reacts with or can be adsorbed to the heat storage materials 3. Examples of the first fluid include water vapor, hydrogen, carbon dioxide, ammonia and the like.

The second fluid is not particularly limited, and may be a gas or a liquid. Typical examples of the second fluid include exhaust gases.

The heat storage materials 3 are not particularly limited, and any materials known in the art can be used. Examples of the heat storage materials 3 include chemical heat storage materials, sensible heat storage materials, and latent heat storage materials. Among them, the chemical heat storage materials are preferable in terms of heat storage density. Examples of the chemical heat storage materials include metal-hydrogen based heat storage materials, metal oxide-water vapor based heat storage materials, metal oxide-carbon dioxide based heat storage materials, metal salt-water vapor based heat storage materials, metal salt-ammonia based heat storage materials, water vapor adsorption based heat storage materials and the like. Among these, the metal oxide-water vapor based heat storage materials, the metal salt-water vapor based heat storage materials, and the water vapor adsorption based heat storage materials are advantageous in terms of ease of handling and costs.

Examples of the metal oxide include MgO, CaO, SrO, BaO, $CaSO_4$ and the like. Examples of the metal salt include $CaCl_2$, $SrCl_2$, $MgCl_2$, LiCl, $SrBr_2$ and the like. The water vapor adsorption based heat storage materials include zeolite and the like.

A filling rate of the heat storage materials 3 in the first flow paths 2 are not particularly limited, and it may preferably be from 30 to 70%. By controlling the filling rate within the above range, the heat output and the amount of heat radiation can be further improved. It should be noted that that if the filling rate is too high, a reaction velocity of heat storage or heat radiation will be decreased, so that an increasing pressure or a decreasing pressure may be required in order to introduce the first fluid into the first flow paths 2.

The heat storage materials 3 may be filled up to the open end 2a of each first flow path 2. However, in terms of preventing the heat storage materials 3 from falling off, the heat storage materials 3 may be enclosed in the first flow paths 2 by forming plugged portions formed of a porous body at the open ends 2a on both sides. The forming of such plugged portions at the open ends 2a on both sides can allow the heat storage materials 3 to be stably maintained in the first flow paths 2 without obstructing the flow of the first fluid in the first flow paths 2.

Here, as an example, a case of using water vapor as the first fluid, an exhaust gas as the second fluid, and $CaCl_2$-water vapor based storage materials as the heat storage materials 3 (an application example as a catalytic converter) will be described. The heat storage materials 3 is usually present in the form of $CaCl_2.2H_2O$.

First, when the exhaust gas is allowed to flow through the second flow paths 5, the heat storage materials 3 filled in the first flow paths 2 are heated as the temperature of the exhaust gas is increased. When the temperature of the exhaust gas is increased to a predetermined temperature or higher, the heat storage materials 3 cause an endothermic reaction (dehydration reaction) to be converted to $CaCl_2$. Subsequently, even if the temperature of the exhaust gas is decreased, the heat storage materials 3 maintain the form of $CaCl_2$.

A water vapor is then allowed to flow through the first flow paths 2, whereby the heat storage materials 3 cause an exothermic reaction (hydration reaction) to be converted to $CaCl_2.2H_2O$. In this case, by allowing the exhaust gas to flow through the second flow paths 5, the heat generated by the exothermic reaction is transmitted to the exhaust gas, so that the temperature of the exhaust gas can be raised. As a result, the heat of the exhaust gas can promote activation of a catalyst.

According to the heat storage reactor 1 of the present embodiment, the pressure control for introducing the first fluid into the first flow paths 2 can be independently performed, and at least a part of the second fluid can allow counter-flow or parallel-flow type heat exchange, so that the heat output and the amount of heat radiation can be increased, and the size of the heat storage reactor can be reduced.

Embodiment 2

A heat storage reactor according to the present embodiment is a hexagonal pillar shaped heat storage reactor. The basic features of the heat storage reactor according to the present embodiment are the same as those of the heat storage reactor 1 according to Embodiment 1. Therefore, only different points are described herein.

Figure 8:
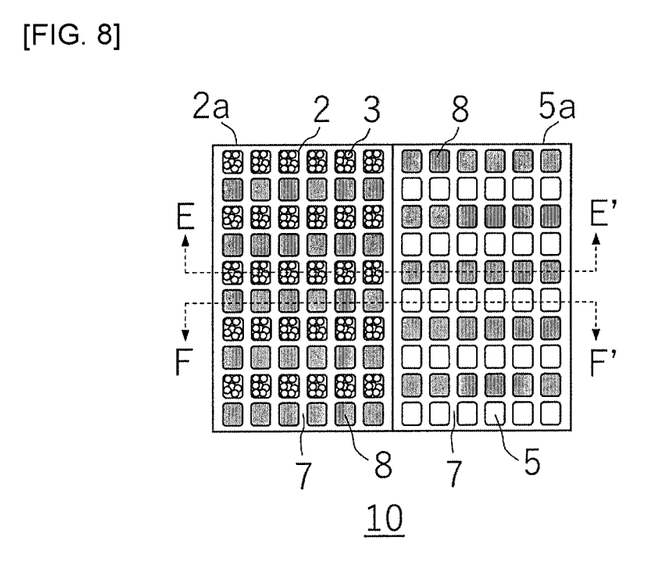
FIG. 8 is a side view of a heat storage reactor according to Embodiment 2.
Figure 9:
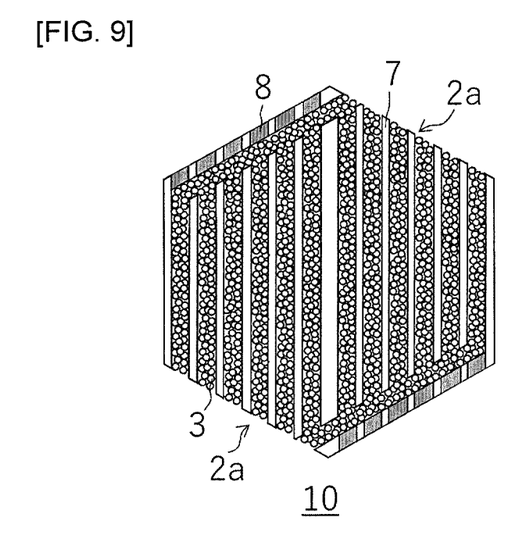
FIG. 9 is a cross-sectional view taken along the line E-E' in FIG. 8.
Figure 10:
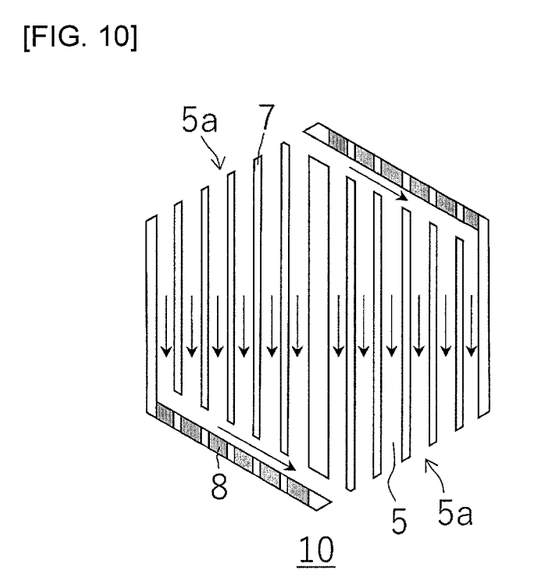
FIG. 10 is a cross-sectional view taken along line F-F' in FIG. 8.

FIG. 8 is a side view of the heat storage reactor according to the present embodiment, FIG. 9 is a cross-sectional view taken along the line E-E' in FIG. 8, and FIG. 10 is a cross-sectional view taken along line F-F in FIG. 8.

As shown in FIGS. 8 to 10, a heat storage reactor 10 according to the present embodiment has six side surfaces, and includes open ends 2a of the first flow paths 2 and open ends 5a of the second flow paths 5 provided on two opposing side surfaces, respectively. Plugged portions 8 are formed on the remaining, opposing one side surface. It should be noted that top and bottom surfaces of the heat storage reactor 10 are outer walls, and have no opening.

Since the open ends 5a of the second flow paths 5 are formed on a side surface different from a side surface on which the open ends 2a of the first flow paths 2 are formed, the introduction of the first fluid to the first flow paths 2 and the introduction of the second fluid into the second flow paths 5 can be performed simultaneously and separately from different sides. Therefore, it is possible to perform independently pressure control for introducing the first fluid into the first flow paths 2, so that the first fluid can be introduced into the first flow paths 2 under a pressure suitable for efficient reaction of the heat storage materials 3 filled in the first flow paths 2.

Further, at least a part of the second flow paths 5 is formed in parallel to the first flow paths 2, thereby allowing areas where the first flow path 2 and the second flow path 5 are adjacent to each other via the partition wall 7 to be easily increased. Therefore, in the heat storage reactor 10 according to the present embodiment, at least a part of the second fluid can perform counter-flow or parallel flow type heat exchange, as in the heat storage reactor 1 according to the first embodiment, so that the heat output and the amount of heat radiation can be increased without increasing the size of the heat storage reactor.

The heat storage reactor 10 having the above structure can be produced according to the production method for a honeycomb structure known in the art. More particularly, first, a green body containing a ceramic raw material is formed to obtain a hexagonal pillar shaped honeycomb formed body, and then fired to obtain a hexagonal pillar shaped honeycomb structure. Openings of one opposing side surface are then plugged to form plugged portions 8, and slits are then formed from the open ends 2a and the open ends 5a to connect spaces of the plurality of first flow paths 2 and spaces the plurality of second flow paths 5. The heat storage materials 3 may be then filled in the first flow paths 2.

According to the heat storage reactor 10 of the present embodiment, the pressure control for introducing the first fluid into the first flow paths 2 can be independently performed, and at least a part of the second fluid can allow counter-flow or parallel-flow type heat exchange, so that the heat output and the amount of heat radiation can be increased, and the size of the heat storage reactor can be reduced.

EXAMPLES

Hereinafter, the present invention will be more specifically described by Examples, but the present invention is not limited by these Examples.

Example 1

A heat storage reactor 1 having a structure shown in each of FIGS. 1 to 5 was produced.

First, a green body containing a ceramic raw material containing silicon carbide and metallic silicon was formed to obtain a circular pillar shaped honeycomb formed body, and then fired to obtain a circular pillar shaped honeycomb structure. Here, the honeycomb structure had a cell cross-sectional shape of (a cross-sectional shape in the direction orthogonal to the cell extending direction) a square having one side of 1.5 mm, a thickness of the partition 7 of 0.5 mm, and a length in the cell extending direction (a length of the first flow path 2) of 60 mm. Further, each partition wall 7 had a heat conductivity of 150 W/m·K, and a heat capacity of 2100 J/L·K. Slits were then formed on a side surface of the circular pillar shaped honeycomb structure to form the open ends 5a of the second flow paths 5, and openings of the second flow paths 5 at both end faces were plugged to form plugged portions 8. Subsequently, $CaCl_2$ as the heat storage materials 3 was filled in the first flow paths 2. The filling rate of the heat storage materials 3 in the first flow paths 2 was 38%.

Example 2

A heat storage reactor 1 was produced in the same method as that of Example 1, with the exception that the cell cross-sectional shape was a square having one side of 0.75 mm and a thickness of the partition wall 7 was 0.25 mm.

Example 3

A heat storage reactor 1 was produced in the same method as that of Example 1, with the exception that the cell cross-sectional shape was a square having one side of 2.5 mm and a thickness of the partition wall 7 was 0.5 mm.

Example 4

A heat storage reactor 1 was produced in the same method as that of Example 1, with the exception that the cell cross-sectional shape was a square having one side of 1.5 mm and a thickness of the partition wall 7 was 1.5 mm.

Example 5

A heat storage reactor 1 was produced in the same method as that of Example 1, with the exception that a green body containing a ceramic raw material containing cordierite was used. Moreover, the partition wall had a heat conductivity of 4.4 W/m·K, and a heat capacity of 1750 J/L·K.

For each of the heat storage reactors 1 of Examples 1 to 5 obtained as described above, an average heat output and a heat radiation amount per volume of the heat storage reactor 1 were evaluated. Specifically, the heat output and the heat radiation amount were determined as follows:

First, a water vapor was fed to the first flow paths 2 of each heat storage reactor 1 under a pressure of 70 kPa and at a flow rate of 2 L/min to cause an exothermic reaction (hydration reaction) of the heat storage materials 3, and an organic solvent (Theral H 350 from Julabo) was allowed to flow through the second flow paths 5. A temperature before the organic solvent passed through the second flow paths 5 of the heat storage reactor 1 and a temperature after the organic solvent passed through the second flow paths 5 of the heat storage reactor 1 were measured, and a temperature difference between them (the temperature after the solvent passed through the second flow paths 5 of the heat storage reactor 1—the temperature before the solvent passed through the second flow paths 5 of the heat storage reactor 1) was calculated.

The average heat output was calculated by the following equation, and the maximum value was determined.

$$\text{Average Heat Output} = \frac{\int \{(\text{Solvent Density}) \times (\text{Solvent Specific Heat}) \times (\text{Solvent Flow Rate}) \times (\text{Temperature Difference})\} dt}{(\text{Time}) \times (\text{Volume of Heat Storage Reactor})} \quad \text{[Equation 1]}$$

The heat radiation amount was calculated by the following equation, and the heat radiation amount after 500 seconds was determined.

$$\text{Heat Radiation Amount} = \frac{\int \{(\text{Solvent Density}) \times (\text{Solvent Specific Heat}) \times (\text{Solvent Flow Rate}) \times (\text{Temperature Difference})\} dt}{(\text{Volume of Heat Storage Reactor})} \quad \text{[Equation 2]}$$

Table 1 shows the evaluation results of the above average heat output and the heat radiation amount.

TABLE 1

| | Material | Length of One Side of Cell Square Cross Sectional Shape (mm) | Thickness of Partition Wall (mm) | Maximum Average Heat Output (W/L) | Heat Radiation Amount after 500 sec. (J/L) |
|---|---|---|---|---|---|
| Example 1 | Si-SiC | 1.5 | 0.5 | 780 | 190 |
| Example 2 | Si-SiC | 0.75 | 0.25 | 1600 | 210 |
| Example 3 | Si-SiC | 2.5 | 0.5 | 500 | 140 |
| Example 4 | Si-SiC | 1.5 | 1.5 | 300 | 90 |
| Example 5 | Cordierite | 1.5 | 0.5 | 800 | 180 |

As shown in the results of Table 1, it was found that the heat output and the heat radiation amount are improved by setting the cell cross-sectional shape to a square having one side of 2.0 mm or less and a thickness of the partition wall 7 of 0.5 mm or less.

It was also found that even if the thermal conductivity of the partition walls 7 was lower, a decreased heat capacity of the partition walls 7 could lead to an increased heat output and an increased heat radiation amount. This would be because when the heat capacity of the partition walls 7 was lower, the temperature of the partition walls 7 was easily increased, and the heat generated from the heat storage materials 3 could be efficiently transmitted to the organic solvent passing through the second flow paths 5.

It was also found that even if the thermal conductivity of the partition walls 7 was lower, the heat output and the heat radiation amount could be increased by shortening the heat transfer distance (the distance between the heat storage layer and the heat exchange layer). This would be because when a short heat transfer distance has a little effect of the thermal resistance due to the lower thermal conductivity of the partition walls 7.

DESCRIPTION OF REFERENCE NUMERALS

1, 10 heat storage reactor
2 first flow path
2a, 5a open end
3 heat storage material
4 heat storage layer
5 second flow path
6 heat exchange layer
7 partition wall
8 plugged portion

The invention claimed is:

1. A heat storage reactor, comprising:
    a plurality of heat storage layers comprising first flow paths through which a first fluid can flow, each of the first flow paths being filled with heat storage materials; and
    a plurality of heat exchange layers comprising second flow paths through which a second fluid can flow,
    wherein the plurality of heat storage layers and the plurality of heat exchange layers are alternately stacked;
    wherein open ends for the second flow paths are formed on a surface different from a surface on which open ends of the first flow paths are formed such that the open ends for the second flow paths are configured to face in a direction different from a direction in which the open ends of the first flow paths are configured to face; and
    wherein at least a part of the second flow paths is formed in parallel to the first flow paths.

2. The heat storage reactor according to claim 1, wherein the heat storage reactor has a honeycomb structure comprising a plurality of cells defined by partition walls, and the first flow paths and the second flow paths are the cells.

3. The heat storage reactor according to claim 1, wherein the heat storage reactor is circular pillar shaped or hexagonal pillar shaped.

4. The heat storage reactor according to claim 2, wherein each of one heat storage layer and one heat exchange layer comprises one row of the plurality of the cells.

5. The heat storage reactor according to claim 2, wherein each of the cells has a cross-sectional shape of a square having one side of 2.0 mm or less, and each of the partition walls defining the cells has a thickness of 0.5 mm or less.

6. The heat storage reactor according to claim 1, wherein a ratio of a length of the first flow paths to a center-to-center distance between the heat storage layer and the heat exchange layer adjacent to each other is from 10 to 500.

7. The heat storage reactor according to claim 2, wherein each of the partition walls defining the cells is formed of a material that satisfies a thennal conductivity of 100 W/m·K or more, and/or a heat capacity of 2000 J/L·K or less.

8. The heat storage reactor according to claim 1, wherein the first flow paths have open ends formed on two different surfaces, wherein the first fluid is introduced into the first flow paths from the open ends provided on both sides by applying pressure.

\* \* \* \* \*